May 18, 1948.                H. O. SCHULTZ                2,441,722
                         ADJUSTABLE DRILL HEAD
                         Filed Nov. 29, 1944                2 Sheets-Sheet 2
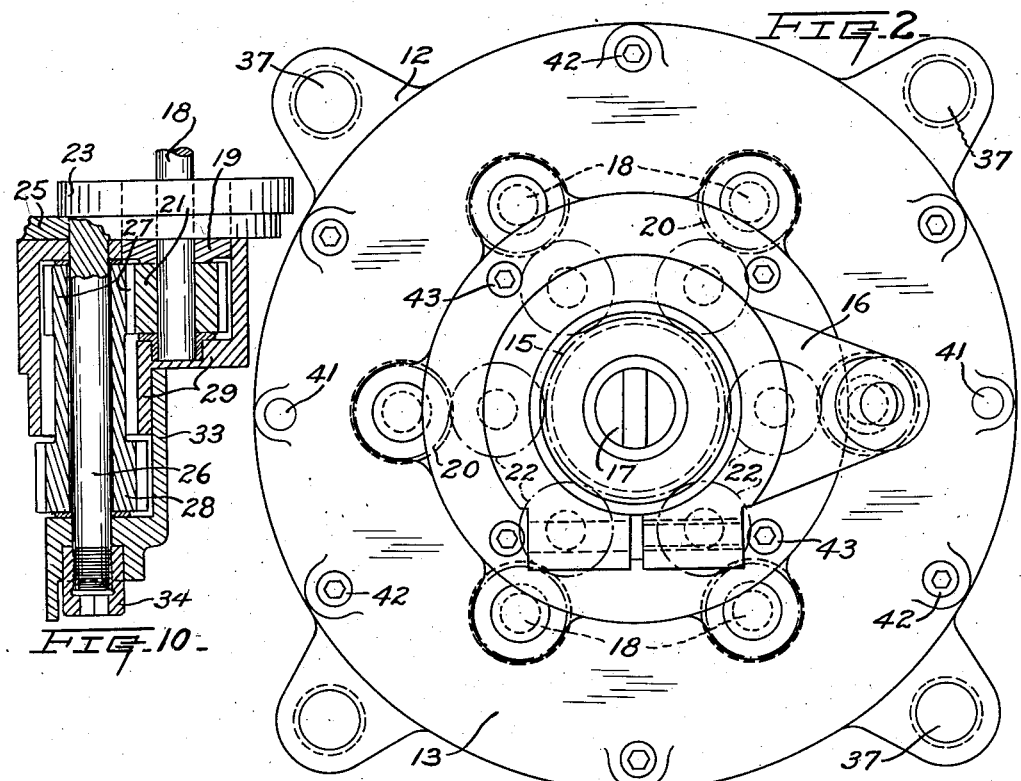
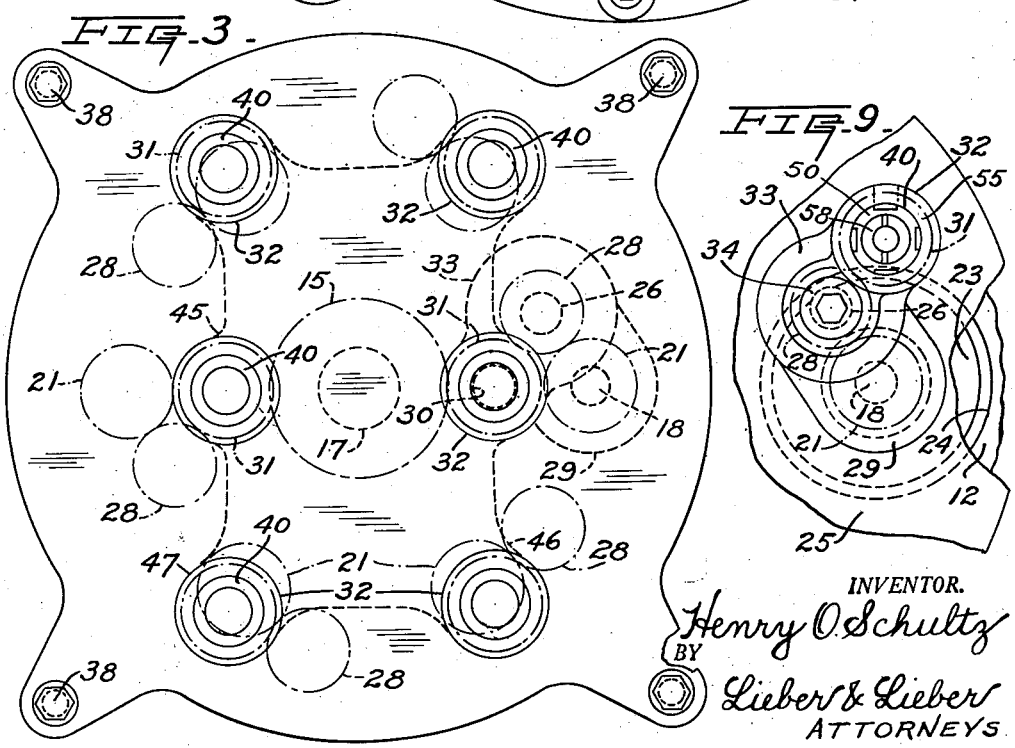
INVENTOR.
Henry O. Schultz
BY
Lieber & Lieber
ATTORNEYS Patented May 18, 1948

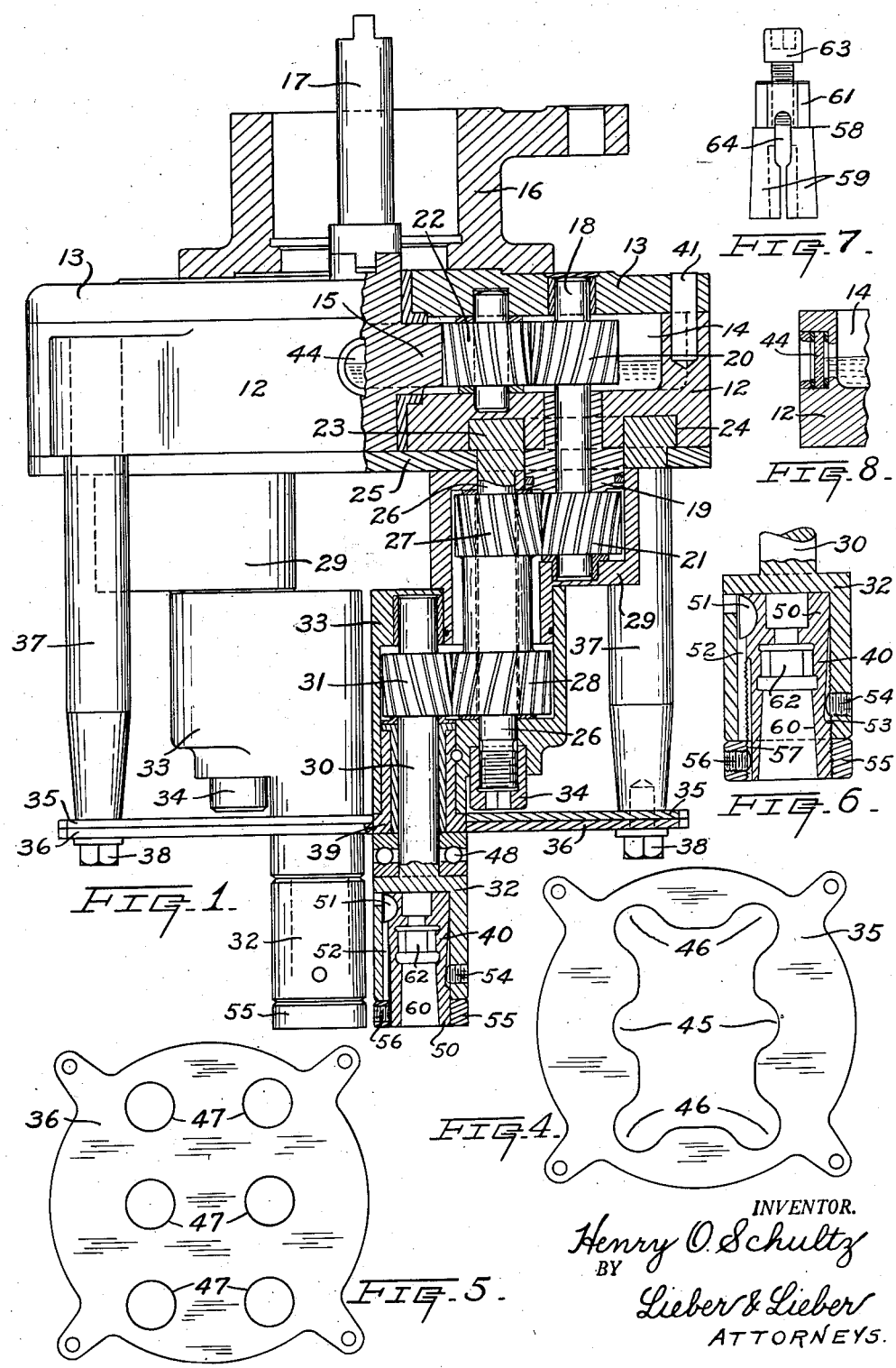

2,441,722

UNITED STATES PATENT OFFICE 2,441,722

ADJUSTABLE DRILL HEAD

Henry O. Schultz, Milwaukee, Wis., assignor to H. O. Schultz, Inc., Milwaukee, Wis., a corporation of Wisconsin Application November 29, 1944, Serial No. 565,628

17 Claims. (Cl. 77—23)

This invention relates in general to improvements in the art of drilling and relates more specifically to improvements in the construction and operation of mechanism for simultaneously driving two or more drills while they are located in pre-selected positions of adjustment.

The principal object of my invention is to provide an improved adjustable drill head or multiple drill drive, which is simple and compact in construction, flexible in its adaptations, and highly efficient in operation.

While it has heretofore been proposed to provide various types of so-called multiple drill heads for simultaneously driving two or more twist drills or the like, and for effecting predetermined adjustment of the drill points so as to permit the formation of holes arranged in diverse patterns, these prior devices have not been entirely satisfactory for various reasons. While some of the previous drill driving heads were capable of adjustment so as to vary the radii of bolt circles on which the groups of holes could be simultaneously drilled, the drillings were limited to circular patterns and could not be readily applied to straight line, rectangular, and other diverse and irregular arrangements, thus materially restricting the utility of these appliances. In most of the prior multiple drill drives, the drill driving spindles while being adapted for relatively rapid adjustment, were not properly supported against undesirable displacement after the adjustments were effected, and they were also considerably limited as to range of adjustment of the drills. Then too, the driving gears or other motion transmitting elements of many of these prior devices, were not properly lubricated and were subjected to unnecessary pressures and forces which resulted in undesirably high power consumption; and most of the previous multiple drill driving assemblages were also relatively cumbersome, complicated, and costly to produce and to maintain. For these and many other specific reasons, the previously proposed multiple drill heads have not proven popular with the trade, except perhaps for special purposes such as the production of groups of holes arranged in circles of different selected diameters.

It is therefore a more specific object of the present invention to provide an improved multiple drill driving assemblage wherein two or more drill driving spindles are quickly and conveniently universally adjustable throughout an extensive area, and in which the drills are most effectively retained against undesirable displacement after each adjustment or change in location thereof has been effected.

Another specific object of this invention is to provide an improved driving mechanism for simultaneously rotating a multiplicity of twist drills, and for effectively selective positioning the drill axes in a variety of definite patterns involving either straight or curved row arrangement of these axes and diverse spacing thereof.

A further specific object of my invention is to provide an improved compact and powerful drill driving head for simultaneously propelling a considerable number of individual drills or the like, and for permitting preselected location of the several drills in circles, polygons, or other patterns throughout an area of considerably greater magnitude than the cross-sectional area of the head.

An additional specific object of the invention is to provide an improved multiple drill head wherein the end thrust on the individual drills is most effectively absorbed without subjecting the motion transmitting gears or other driving elements to undesirable pressure, and in which all moving parts are abundantly lubricated at all times.

Still another specific object of this invention is to provide improved instrumentalities for effecting rapid and accurate selective positioning of a multiplicity of individual drill spindles, and subsequent positive retention of the spindles in the desired locations.

Another specific object of my invention is to provide a durable multi-drill assembly which may be manufactured and maintained at moderate cost while being extremely flexible in its uses, and wherein drills of various sizes may be readily applied and removed and are most effectively driven while in use.

These and other specific objects and advantages of the invention will be apparent from the following detailed description.

A clear conception of the several features constituting my invention, and of the mode of constructing and of utilizing multiple drill heads embodying the improvement, may be had by referring to the drawings accompanying and forming a part of this specification wherein like reference characters designate the same or similar parts in the various views.

Fig. 1 is a part sectional side elevation of a typical multiple spindle drill head built according to my invention, the section having been taken radially through one of the spindle adjusting mechanisms and drives;

Fig. 2 is a top view of a drill head such as shown in Fig. 1 and having six drill spindle drives associated therewith;

Fig. 3 is a bottom view of the same six spindle head, showing the spindles and the drill adaptors thereof positioned and held in symmetrical rectangular arrangement;

Fig. 4 is a reduced plan view of the upper template which is associated with the drill head of Fig. 2 to effect quick positioning of the spindles into the pattern formation shown therein and to also assist in holding the spindles in desired position;

Fig. 5 is a similarly reduced plan view of the lower positioning and spindle retaining template which is finally associated with the multiple drill head to hold the spindles as in Fig. 3;

Fig. 6 is a somewhat enlarged central vertical section through one of my improved drill adaptors which constitute part of the rotary drill spindles;

Fig. 7 is a similarly enlarged side elevation of one of the improved drill holding collets which are normally carried by the improved adaptors;

Fig. 8 is a fragmentary section through the multiple drill head taken radially through the oil level indicator of the lubricant supply reservoir.

Fig. 9 is a fragmentary bottom view of one of the six double-eccentric drill spindle adjusting and driving assemblages; and Fig. 10 is a fragmentary section through the spindle adjusting, holding and driving assemblage of Fig. 9.

While the invention has been shown and described herein as being embodied in a typical six spindle gear driven multiple drill head having special holding templates and drill adaptors associated therewith, it is not my desire or intention to thereby unnecessarily restrict the scope or limit the utility of the improvements which are obviously more generally applicable.

Referring to the drawings, the improved multiple drill head shown therein comprises in general an annular upper body or gear casing 12 having a top closure or cover plate 13 coacting therewith to form an annular lubricant chamber 14; a main driving gear 15 journalled centrally within the casing 12 and plate 13 for rotation within the chamber 14; an adaptor or rigid support 16 for fixedly suspending the plate 13 and casing 12 from stationary parts of a drill press or the like; a main drive shaft 17 detachably connected to the main gear 15 within the adaptor support 16; six equally spaced countershafts 18 also journalled in the cover plate 13 and in bearing bushings 19 carried by the casing 12, and each having an upper gear 20 and a lower gear 21 drivingly attached thereto; six idler gears 22 drivingly connecting the main gear 15 with the adjacent upper gears 20 within the chamber 14; an annular series of six rotary adjusting and clamping rings 23 confined within equally spaced annular lower recesses 24 formed in the casing 12 and each having peripheral coaction with a lower plate 25 which is rigidly secured to the casing 12, each of the rings 23 having an idler shaft 26 formed integral therewith and depending therefrom; an idler gear assemblage consisting of integrally united upper and lower gears 27, 28 respectively, rotatable about each idler shaft 26, and having their upper gears 27 in driving coaction with the adjacent lower drive gears 21; an idler housing 29 enclosing each set of coacting gears 21, 27 and engaging the bottoms of the adjacent rings 23 and lower plate 25, these housings being swingably adjustable about the fixed axes of the adjacent countershafts 18; a series of six drill spindle shafts 30 each having a driving gear 31 coacting with the adjacent lower idler gear 28 and also having a lower drill adaptor socket 32 at its lower end; a spindle housing 33 rotatably supporting each shaft 30 and enclosing the adjacent gear 31, these housings being swingably suspended from the adjacent idler housings 29 for adjustment about the adjustable axes of the corresponding idler shafts 26; a clamping nut 34 coacting with end screw threads formed on each idler shaft 26 and with the adjacent spindle housing 33 to firmly lock the relatively eccentric telescopically mounted housings 29, 33 in various positions of adjustment; a pair of upper and lower mutually coacting spindle retaining templates 35, 36 respectively, suspended from the main casing 12 by means of rigid columns 37 and cap screws 38, and being formed to engage the spindle housings 33 through bushings 39 carried by these housings; and an improved adaptor 40 for effecting detachable connection of the drills to each of the sockets 32.

The cover plate 13 may be properly positioned and firmly secured to the annular main casing 12 with the aid of dowels 41 and headless screws 42, and the suspension support 16 may likewise be detachably secured to the top plate 13 by means of headless screws 43, as shown in Fig. 2, in order to avoid external projections while still permitting ready assembly and dismantling of these parts. The lubricant chamber 14 of the main casing 12 may also be provided with a suitable filling opening and with an oil level indicator 44 as shown in Figs. 1 and 8, in order to provide a sight indication of the oil level within this chamber. Oil from within this lubricant chamber 14, besides maintaining the gears 15, 20, 22 properly lubricated at all times, is adapted to flow by gravity along the bearing bushings 19 and shafts 18 into the idler housing 29, and from thence past the gears 21, 27 into the spindle housing 33. While thus flowing past the several gears and along the shafts confined within the housings 29, 33, the oil will obviously maintain all moving parts well lubricated at all times, and fresh lubricant may be periodically admitted to the supply chamber 14.

The housings 29, 33 may be effectively sealed against undesirably free escape of lubricant, in any suitable manner; and the double eccentricity or adjustment afforded by these pivotally interconnected housings 29, 33 and the locking or clamping afforded by the rings 23, shafts 26 and nuts 34, constitute important features of the present invention. As clearly illustrated in Figs. 1, 3, 9 and 10, each of the drill carrying spindle shafts 30, is adjustable about the corresponding driving countershaft 18, independently of all others, and the axes of the several drill carrying shafts 30 may be disposed anywhere within the limits of swing of the combined radii of swing of the two housings 29, 33 constituting each set, about its fixed pivot shaft 18. As shown in Fig. 1, the two housings 29, 33 have been adjusted to the maximum extent so that the shaft 30 is in the extreme position away from the corresponding pivot shaft 18. The drill carrying shaft 30 may however be swung into axial alinement with the corresponding countershaft 18; or it may be shifted about the adjacent idler shaft 26 to any other intervening position with respect to the fixed counter shaft 18, thus providing extreme flexibility in the assemblage.

The various adjustments of the individual spindle shafts 30 may be quickly and conveniently made upon removal of the templates 35, 36 and release of the clamping nuts 34, and these templates may be formed of sheet metal and of diverse patterns corresponding to the work which is to be performed. As illustrated in Figs. 3, 4 and 5, the templates 35, 36 have been constructed so as to position the drill spindle shafts 30 in rectangular formation, and when utilizing templates of a definite predetermined shape, the nuts 34 may be released sufficiently to permit relatively free swinging of the housings 29, 33 about their respective shafts 18, 26, whereupon the centrally open upper template 35 may be applied to the columns 37 with the bushings 39 projecting through the central opening. The bushings 39 may then be swung and positioned within the side and corner notches 45, 46 of the central template opening, whereupon the initial positioning template 35 may be carefully removed and the nuts 34 should be tightened to clamp the housings 29, 33 in the desired position. The upper and lower templates 35, 36 may thereafter be applied in succession and firmly secured to the columns 37 with the aid of the set screws 38, whereupon the notches 45, 46 and the alined round holes 37 of the lower template 36 will maintain the spindle shafts 39 in proper desired position.

As previously indicated, the adjusting and clamping rings 23 are snugly confined within circular recesses 24 formed in the main casing 12, and coact with the flat bottom plate 25 which is firmly but detachably secured to the bottom of the casing 12 by means of screws or otherwise. The idler shafts 26 are firmly attached to or formed integral with their respective rings 23, so that these shafts may be swung about the axes of the adjacent countershafts 18, by revolving the corresponding rings 23 when the nuts 34 have been released. However, when the clamping nuts 34 are tightened, these nuts clamp the telescopic spindle housings 33 against the adjacent idler housings 29, and also firmly clamp the housings 29 against the lower plate 25, by pulling the peripheral edges of the rings 23 snugly against this plate 25, so that the housings 29, 33 cannot thereafter move out of their adjusted and clamped positions. This clamping is also effected so as to avoid clamping the enclosed gears 21, 27, 28, 31, and in order to avoid having the end thrust introduced by the individual drills, shift the spindle shafts 30 upwardly into the housings 33, anti-friction or ball thrust bearings 48 are preferably introduced between the sockets 32 and bushings 39, as shown in Fig. 1.

In order to permit rapid and convenient interchanging of drills, and in view of the fact that the spindle sockets 32 are formed integral with or are permanently rigidly united with their spindle shafts 30, special drill adaptors 40 are preferably provided. The detailed construction of these adaptors is shown in Figs. 6 and 7, and each adaptor 40 comprises an elongated cylindrical member 50 snugly fitted within the bore of the spindle socket 32 and having a key 51 secured to one side thereof which is slidably cooperable with a key-way 52 formed in the socket, while its opposite side is provided with a tapered groove 53 adapted to coact with a retaining screw 54 carried by the socket 32; a thrust collar 55 having screw thread coaction with the outer end of the member 50 and being provided with another set screw 56 adapted to coact with a recess 57 formed in the member 50, so as to lock this member in axially adjusted position; a split collet 58 having tapered jaws 59 cooperable with the shank of a twist drill and with the tapered bore 60 of the member 50, and also being provided with a polygonal upper end 61 adapted to snugly fit a similarly polygonal pocket 62 formed in the member 50; and a drill clamping screw 63 cooperable with the member 50 and with the collet 58 in order to draw the latter within the bore 60 so as to cause the jaws 59 to firmly clamp the drill shank. The collets 58 may be provided with drill shank engaging bores of different diameters adapted to receive drills of different sizes, but all having tapered jaws 59 which are snugly cooperable with the tapered bore 60 of the member 50, and the upper ends of the jaws 59 are separated by a slot 64 which is formed to fit the upper flat ends of the drill shanks. The improved adaptors 40 are therefore capable of cooperating with standard twist drills of various sizes, and these drills may obviously be readily applied or removed and are firmly clamped within the collets 58 when properly applied thereto.

During normal use of the improved multiple drill assemblage, the unit may be readily attached to or removed from the drill press with the aid of the adaptor support 16, in a manner well known to those skilled in the art, whenever necessary. Templates of any suitable configuration may then be applied to the columns 37 and the spindle sockets 32 may be positioned to produce any desired pattern within the range of swinging adjustment afforded by the housings 29, 33; and it is to be noted that the spindle sockets 32 may be located considerably beyond the periphery of the main casing 12, if so desired. The individual twist drills may obviously be firmly clamped within the sockets 32 with the aid of the improved adaptors 40, and the collets 58 will permit the application of twist drills of different diameters, so that some of these collets 58 may be provided with drills of a predetermined diameter while others may be provided with drills of larger or smaller diameters, thus enhancing the flexibility of the unit to a maximum. When the clamping nuts 34 have been placed into clamping position, and the templates 35, 36 as well as the pre-selected drills have been properly applied, power may be applied to the main driving shaft and such application of power to the main driving shaft 17 will thereafter be transmitted through the several trains of gears to the spindle shafts 30, and from thence to the individual drills so as to permit accurate drilling of holes following the pre-selected pattern formed by the templates 35, 36. It is to be noted, however, that the use of these templates 35, 36 is not absolutely necessary since the clamping of the housings 29, 33 afforded by the nuts 34, will rigidly hold the drill spindle shafts 30 in various positions of adjustment. The use of the templates 35, 36 is desirable only when a large number of successive groups of holes are to be drilled according to a predetermined pattern, and these templates 35, 36 will then afford additional support for the housings 33 and spindle shafts 30. The thrust induced during drilling operations upon the spindle shafts 30 will be taken up by the anti-friction bearings 48 and the gears 31, 28, 27 will therefore be relieved of end thrust and will be freely rotatable with the application of minimum power. Oil from the chamber 14 will gravitate along the shafts and past the several gears and will thus maintain all parts abundantly lubricated, so that the improved assemblage is adapted to operate at maximum efficiency and will be automatically maintained in operative condition if the chamber 14 is properly supplied with lubricant.

From the foregoing detailed description it will be apparent that my present invention provides an improved multiple drill head assemblage which is universally adjustable throughout an extensive area and in which the multiplicity of drills may be positively located with the drill spindles adapted to produce a variety of patterns. The improved adjusting and locking assemblages while permitting convenient adjustment of the drill spindles, also positively locks these spindles in various positions of adjustment, and the spindle shafts 30 may be arranged either in curved or straight lines and may be brought closely adjacent to each other. Any number of drill spindles may obviously be used in constructing the improved heads, and by utilizing equal adjusting radii for the eccentric housings 29, 33, the axes of the spindle shafts 30 may be brought into perfect alinement with the axes of the fixed countershafts 18. The improved templates serve to both definitely locate the drills and to reinforce the spindles near the work, and also facilitate quick and accurate adjustment of the drills so as to follow definite patterns, and the adjusting rings 23 with their integral shafts 26 permit clamping to be effected as close as possible to the axes of the spindle shafts 30 and of the countershafts 18. The clamping effect afforded by the nuts 34 produces metal-to-metal clamping between the housing 33 and the housing 29, and also between the housing 29 and the fixed plate 25; and the improved adaptors 40 besides permitting quick changing of drills, also insure rigidity in the assemblage and provide positive drives between the spindle shafts 30 and the drills. The improved multiple drill head has proven highly successful and flexible in actual operation and may obviously be manufactured and maintained in operating condition at moderate cost.

It should be understood that it is not desired to limit this invention to the exact details of construction, or to the precise mode of use, herein shown and described, for various modifications within the scope of the appended claims may occur to persons skilled in the art.

I claim:

1. A multiple drill assemblage, comprising, a casing, a plurality of countershafts journalled in said casing, means for rotating said shafts, a clamping ring adjustably revolvable about each of said countershafts, each of said rings having an idler shaft rigidly attached thereto and extending parallel to the adjacent countershaft, means coacting with each idler shaft for clamping the adjacent ring to said casing, a spindle shaft revolvably adjustable about each of said idler shafts, and gearing drivingly interconnecting the counter and spindle shafts of each set through the intervening idler shaft.

2. A multiple drill assemblage, comprising, a casing, a plurality of countershafts journalled in said casing, means for rotating said shafts, a clamping ring adjustably revolvable about each of said countershafts, each of said rings having an idler shaft rigidly attached thereto and extending parallel to the adjacent countershaft, a spindle shaft revolvably adjustable about each of said idler shafts, gearing drivingly interconnecting the counter and spindle shafts of each set through the intervening idler shaft, and common means cooperating with each of said rings through its idler shaft to lock the spindle and idler shafts of each set in various positions of adjustment.

3. A multiple drill assemblage, comprising, a casing, a plurality of clamping rings revolvably adjustable upon said casing and each having an eccentrically disposed idler shaft projecting therefrom, parallel to the ring axis, an idler housing adjustable about each of said ring axes and coacting with said casing, a spindle housing revolvably adjustable about each of said idler shafts and coacting with the adjacent idler housing, a spindle shaft journalled in each of said spindle housings eccentrically of the adjacent idler shaft, means coacting directly with said idler shafts for clamping said housings against said casing in various positions of adjustment, and means for simultaneously rotating said spindle shafts.

4. A multiple drill assemblage, comprising, a casing, a plurality of clamping rings revolvably adjustable upon said casing and each having an eccentrically disposed idler shaft projecting therefrom parallel to the ring axis, an idler housing adjustable about each of said ring axes and coacting with said casing, a spindle housing revolvably adjustable about each of said idler shafts and coacting with the adjacent idler housing, a spindle shaft journalled in each of said spindle housings eccentrically of the adjacent idler shaft, a nut coacting with each of said idler shafts and with the adjacent spindle housing for clamping said housings into various positions of adjustment, and a train of gears extending through each set of said housings for transmitting rotary motion to the corresponding spindle shafts.

5. A multiple drill assemblage, comprising, a casing, a plurality of clamping rings revolvably adjustable upon said casing and each having an idler shaft fixedly attached thereto and projecting therefrom parallel to the ring axis, an idler housing adjustable about each of said ring axes and coacting with said casing, a spindle housing revolvably adjustable about each of said idler shafts and coacting with the adjacent idler housing, a spindle shaft journalled in each of said spindle housings eccentrically of the adjacent idler shaft, means coacting directly with said idler shafts for clamping said housings against said casing in various positions of adjustment, an idler gear rotatable about each of said idler shafts within the corresponding set of said housings, common means for rotating all of said gears, and gears carried by said spindle shafts and coacting with the adjacent idler gears.

6. A multiple drill assemblage, comprising, a casing, a plurality of clamping rings revolvably adjustable upon said casing and each having an idler shaft fixedly attached thereto and projecting therefrom parallel to the ring axis, an idler housing adjustable about each of said ring axes and coacting with said casing, a spindle housing revolvably adjustable about each of said idler shafts and coacting with the adjacent idler housing, a spindle shaft journalled in each of said spindle housings eccentrically of the adjacent idler shaft, clamping means coacting with each of said idler shafts and with the adjacent spindle housing for clamping said rings and housings into various positions of adjustment, an idler gear freely rotatable about each of said idler shafts within the corresponding set of said housings, common means for rotating all of said idler gears, and gears carried by said spindle shafts and coacting with the adjacent idler gears.

7. A drill assemblage, comprising, a casing, a clamping ring revolvably adjustable upon said casing and having an idler shaft fixedly attached thereto and projecting therefrom parallel to the ring axis, an idler housing adjustable about said ring axis and coacting with said casing, a spindle housing revolvably adjustable about said idler shaft and coacting with said idler housing, a spindle shaft journalled in said spindle housing eccentrically of said idler shaft, means coacting directly with said idler shaft and through the housings with said ring for clamping said housings against said casing in various positions of adjustment, and means for rotating said spindle shaft.

8. A drill assemblage, comprising, a casing, a clamping ring revolvably adjustable upon said casing and having an eccentrically disposed idler shaft fixedly attached thereto and projecting therefrom parallel to the ring axis, an idler housing adjustable about said ring axis and coacting with said casing, a spindle housing revolvably adjustable about said idler shaft and coacting with said idler housing, a spindle shaft journalled in said spindle housing eccentrically of said idler shaft, means coacting directly with said idler shaft and through the housings with said ring for clamping said housings against said casing in various positions of adjustment, an idler gear rotatable about said idler shaft within said housings, means for rotating said gear, and means for drivingly connecting said gear to said spindle shaft.

9. A drill assemblage, comprising, a casing, a clamping ring revolvably adjustable upon said casing and having an idler shaft projecting therefrom parallel to the ring axis and revolvable to any position about said axis, an idler housing adjustable about said ring axis and coacting with said casing, a spindle housing revolvably adjustable about said idler shaft and coacting with said idler housing, a spindle shaft journalled in said spindle housing eccentrically of said idler shaft, clamping means coacting with said idler shaft and with said spindle housing for clamping said housings into various positions of adjustment, an idler gear freely rotatable about said idler shaft within said housings, means passing through said ring for rotating said idler gear, and a driving connection between said idler gear and said spindle shaft.

10. A drill assemblage, comprising, a casing, a clamping ring revolvably adjustable upon said casing and having an eccentrically disposed idler shaft projecting parallel to the ring axis and revolvable to any position about said axis, an idler housing adjustable about said ring axis and coacting with said casing, a spindle housing revolvably adjustable about said idler shaft and coacting with said idler housing, a spindle shaft journalled in said spindle housing eccentrically of said idler shaft, the spacing between said spindle shaft and said idler shaft and between said idler shaft and the center of said ring being equal, means coacting with said idler shaft for clamping said housings and said ring against said casing in various positions of adjustment, and means for rotating said spindle shaft through said housings.

11. A drill assemblage, comprising a casing, an annular series of clamping rings each independently revolvable upon said casing and each having a rigid idler shaft projecting therefrom and away from said casing parallel to its carrier ring axis, an idler housing coacting with each of said idler shafts and being swingably adjustable therewith to any position about the adjacent ring axis, a drive shaft journalled in said casing centrally of each of said clamping rings, gearing connecting each of said drive shafts with the adjacent idler shaft, means coacting directly with each of said idler shafts for clamping the corresponding ring and idler housing to said casing, and a drill spindle shaft drivingly associated with the gearing coacting with each of said idler shafts.

12. A drill assemblage, comprising, a casing, a clamping ring revolvable upon said casing and having a rigid idler shaft projecting therefrom and away from said casing parallel to the ring axis, an idler housing coacting with said idler shaft and being swingable therewith to any position about the ring axis, a drive shaft journalled in said casing centrally of said ring, gearing connecting said drive shaft with said idler shaft within said housing, means coacting directly with said idler shaft remote from said casing for clamping both said ring and housing to the casing, and a tool actuating spindle shaft drivingly associated with said gearing coacting with the idler shaft.

13. A multiple spindle drill head, comprising a body member having a plurality of cylindrical recesses therein; a plurality of cylindrical barrels rotatably mounted in said recesses; a spindle passing through the body member and the central axis of each barrel; a head on each end of the spindle engaging the body member and the barrel to retain same in coacting relationship; a plurality of drill holder carriers, each drill holder carrier being rotatably mounted on a barrel, and eccentric to the axis of rotation of the barrel; a plurality of drill holders, each drill holder being rotatably mounted on its drill holder carrier and eccentric to the axis of rotation of the drill holder carrier; a main drive shaft; and power transmission means between the drive shaft and the drill holders for rotating the latter.

14. A multiple spindle drill head, comprising a body member having a plurality of cylindrical recesses therein; a plurality of cylindrical barrels rotatably mounted in said recesses; a spindle passing through the body member and the central axis of each barrel; a head on each end of the spindle engaging the body member and the barrel to retain same in coacting relationship; a plurality of drill holder carriers, each drill holder carrier being rotatably mounted on a barrel and eccentric to the axis of rotation of the barrel, the inner surface of each drill holder carrier bearing on the outer surface of its barrel; means for clamping each drill holder carrier against its barrel; a plurality of drill holders, each drill holder being rotatably mounted on its drill holder carrier and eccentric to the axis of rotation of the drill holder carrier; a main drive shaft; and power transmission means between the drive shaft and the drill holders for rotating the latter.

15. A multiple spindle drill head, comprising a body member having a plurality of cylindrical recesses therein; a plurality of cylindrical barrels rotatably mounted in said recesses, the under surfaces of the body member and the barrel being substantially co-planar; a spindle passing through the body member and the central axis of each barrel; a head on each end of the spindle engaging the body member and the barrel to retain same in co-acting relationship; a plurality of drill holder carriers, each drill holder carrier being rotatably mounted on a barrel and eccentric to the axis of rotation of the barrel; a plurality of drill holders, each drill holder being rotatably mounted on its drill holder carrier and eccentric to the axis of rotation of the drill holder carrier; a main drive shaft; and power transmission means between the drive shaft and the drill holders for rotating the latter.

16. A multiple drill assemblage, comprising a casing, a plurality of countershafts journalled in said casing, means for rotating said shafts, a clamping element revolvable entirely about each of said countershafts, each of said clamping elements having an idler shaft carried thereby and revolvable for adjustment therewith and extending parallel to the adjacent countershaft, means coacting with each idler shaft for clamping the adjacent clamping element to said casing in any position of adjustment, a spindle shaft revolvably adjustable about each of said idler shafts, and gearing drivingly interconnecting the counter and spindle shafts of each set through the intervening idler shaft.

17. A multiple drill assemblage, comprising a casing, a plurality of countershafts journalled in said casing for rotation about fixed parallel axes, means for simultaneously rotating said shafts, an idler shaft disposed parallel to the axis of each of said countershafts, a carrier member for each of said idler shafts, each of said carrier members being rotatable with its idler shaft about one of said countershafts, a drill spindle shaft disposed parallel to and being adjustable to any position about the axis of each of said idler shafts, gearing drivingly connecting each of said countershafts with the corresponding spindle shaft through the idler shaft of each set, and means for locking said idler and spindle shafts of each set in adjusted position relative to the corresponding countershaft.

HENRY O. SCHULTZ.

REFERENCES CITED

The following references are of record in the file of this patent:

UNITED STATES PATENTS

| Number | Name | Date |
| --- | --- | --- |
| 584,910 | Warner | June 22, 1897 |
| 1,449,164 | Buhr | Mar. 20, 1923 |
| 1,845,123 | Buhr | Feb. 16, 1932 |
| 2,337,400 | Maute | Dec. 21, 1943 |